United States Patent
Peleg et al.

(10) Patent No.: US 6,492,990 B1
(45) Date of Patent: Dec. 10, 2002

(54) METHOD FOR THE AUTOMATIC COMPUTERIZED AUDIO VISUAL DUBBING OF MOVIES

(75) Inventors: Shmuel Peleg, Jerusalem (IL); Ran Cohen, Petach Tikva (IL); David Avnir, Jerusalem (IL)

(73) Assignee: Yissum Research Development Company of the Hebrew University of Jerusalem, Jerusalem (IL)

( * ) Notice: Subject to any disclaimer, the term of this patent is extended or adjusted under 35 U.S.C. 154(b) by 0 days.

(21) Appl. No.: 09/051,417
(22) PCT Filed: Oct. 7, 1996
(86) PCT No.: PCT/IB96/01056
§ 371 (c)(1),
(2), (4) Date: Jul. 15, 1998
(87) PCT Pub. No.: WO97/15926
PCT Pub. Date: May 1, 1997

Related U.S. Application Data

(60) Provisional application No. 60/008,874, filed on Dec. 19, 1995.

(30) Foreign Application Priority Data

Oct. 8, 1995 (IL) .................................. 115552

(51) Int. Cl.$^7$ .............................................. G06T 15/70
(52) U.S. Cl. ...................... 345/473; 345/949; 345/957; 345/956; 707/101; 707/102
(58) Field of Search ................................ 345/302, 473, 345/949, 957, 956; 707/101, 102, 530

(56) References Cited

U.S. PATENT DOCUMENTS

| | | | |
|---|---|---|---|
| 4,569,026 A | 2/1986 | Best | 345/327 |
| 4,600,281 A | 7/1986 | Bloomstein | |
| 4,884,972 A | 12/1989 | Gasper | 345/473 |
| 5,111,409 A | 5/1992 | Matthews, III et al. | |
| 5,557,724 A | 9/1996 | Sampat et al. | 345/342 |

FOREIGN PATENT DOCUMENTS

| | | |
|---|---|---|
| EP | 179 701 | 4/1986 |
| EP | 674 315 | 9/1995 |

OTHER PUBLICATIONS

Morishima et al., Facial Expression Synthesis Based on Natural Voice for Virtual Face–to Face Communication with Machine, Sep. 1993, pp. 486–489.

Platt et al., Animating Facial Expressions, Aug. 1981, pp. 247, 249–250.

Nakagawa et al., An Experimental PC–based Media Conversion System, Aug. 1993, pp. 141–142.

*Primary Examiner*—Mark Zimmerman
*Assistant Examiner*—Kimbinh T. Nguyen
(74) *Attorney, Agent, or Firm*—Lowe Hauptman Gilman & Berner, LLP

(57) ABSTRACT

A method using computer software for automatic audio visual dubbing (5) using an efficient computerized automatic method for audio visual dubbing of movies by computerized image copying of the characteristic features of the lip movements of the dubber onto the mouth area of the original speaker. The invention uses a method of vicinity-searching, three-dimensional head modeling of the original speaker (3), and texture mapping (10) technique to produce new images which correspond to the dubbed sound track: The invention thus overcomes the well known disadvantage of the correlation problems between lip movement in an original movie and the sound track of the dubbed movie.

25 Claims, 4 Drawing Sheets

METHOD FOR THE AUTOMATIC COMPUTERIZED AUDIO VISUAL DUBBING OF MOVIES

This application claims priority from U.S. Provisional Application No. 60/008874 filed Dec. 19, 1995.

Portions of this application are contained on compact disc(s) the contents of which are entirely incorporated herein by reference. The compact discs are labeled as Copy 1, and Copy 2, respectively. The compact discs are identical and each includes the following ASCII files:

| File Name | File Size | Creation Date |
| --- | --- | --- |
| dub.c | 27937 | Nov. 4, 2001 3:47 pm |
| general.c | 26904 | Nov. 4, 2001 3:47 pm |
| gimg.h | 2518 | Nov. 4, 2001 3:47 pm |
| io.c | 1299 | Nov. 4, 2001 3:47 pm |
| list.h | 1941 | Nov. 4, 2001 3:47 pm |
| mv.h | 4470 | Nov. 4, 2001 3:47 pm |
| texture.c | 2984 | Nov. 4, 2001 3:47 pm |

FIELD OF THE INVENTION

The present invention relates to a method for automatic audio visual dubbing. More specifically the said invention relates to an efficient computerized automatic method for audio visual dubbing of movies by computerized image copying of the characteristic features of the lips movements of the dubber onto the mouth area of the original speaker. The present invention uses a method of vicinity-searching, three-dimensional head modeling of the original speaker, and texture mapping techniques in order to produce the new images which correspond to the dubbed sound track.

The invention overcomes the well known disadvantage of the correlation problems between lips movement in the original movie and the sound track of the dubbed movie.

DEFINITIONS OF TERMS RELATED TO THE INVENTION

First are provided some definitions of important key words employed in this specification.

Actor (the original actor)—an actor, speaker, singer, animated character, animal, an object in a movie, or a subject in a still photograph.

Audio visual Dubbing—Manipulating, in one or more frames, the mouth area of the actor so that its status will be similar as much as possible to that of the dubber in the reference frame.

Correlation Function—A function describing the similarity of two image regions. The higher the correlation, the better is the match.

Dubber—The person or persons, who speak/narrate/sing/interpret the target text. The dubber can be the same as the actor.

Dubbing—Replacing part or all of one or more of the original sound tracks of a movie, with its original text or sounds (including the case of the silent track of a still photograph), by another sound track containing the target text and/or sound.

Edge Detector—A known image processing technique used to extract boundaries between image regions which differ in intensity and/or color.

Face Parametrization—A method that numerically describes the structure, location, and expression of the face.

Head Model—A three-dimensional wire frame model of the face that is controlled by numerous parameters that describe the exact expression produced by the model (i.e. smile, mouth width, jaw opening, etc.).

Movie (the original movie)—Any motion picture (e.g. cinematic feature film, advertisement, video, animated cartoon, still video picture, etc.). A sequence of consecutive pictures (also called frames) photographed in succession by a camera or created by an animator. In the case of the movie being a still photograph, all of the consecutive pictures are identical to each other. When shown in rapid succession an illusion of natural motion is obtained, except for the case of still pictures. A sound-track is associated with most movies, which contains speech, music, and/or sounds, and which is synchronized with the pictures, and in particular where the speech is synchronized with the lip movements of the actors in the pictures. Movies are realized in several techniques. Common methods are: (a) recording on film, (b) recording in analog electronic form ("video"), (c) recording in digital electronic form, (d) recording on chips, magnetic tape, magnetic disks, or optical disks, and (e) read/write by magnetic and/or optical laser devices. Finally, in our context, an "original movie" is also an audio-visual movie altered by the present invention, which serves as a base for further alterations.

Original Text—A text spoken or sung by the actor when the movie is being made, and which is recorded on its sound track. The text may be narrated in the background without showing the speaker, or by showing a still photograph of the speaker.

Pixel—Picture element. A digital picture is composed of an array of points, called pixels. Each pixel encodes the numerical values of the intensity and of the color at the corresponding picture point.

Reference Similarity Frame—A picture (being a frame in the original movie, a frame in any other movie, or a still photograph) in which the original actor has the desired features of the mouth-shape and head posture suitable for the audio visually dubbed movie.

Target Text—A new vocal text, to replace the original vocal text of the actor. The target text may also be that which is to be assigned to an actor who was silent in the original movie. The new text can be in another language, to which one refers as DUBBING. However, this invention relates also to replacement of text without changing the language, with the original actor or with a dubber in that same language. The target text may have the same meaning as the original text, but may have also a modified, opposite, or completely different meaning. According to one of many applications of the present invention, the latter is employed for creation of new movies with the same actor, without his/her/its active participation. Also included is new vocal text used to replace the null vocal text attached to one or more still photographs.

Texture Mapping—A well known technique in computer graphics which maps texture onto a three-dimensional wire frame model.

Two-Dimensional Projection—The result of the rendering of the three-dimensional face model onto a two-dimensional device like a monitor, a screen, or photographic film.

BACKGROUND OF THE INVENTION

Movies are often played to an audience that is not familiar with the original language, and thus cannot understand the sound track of such movies. Two well known common approaches exist to solve this problem. In one approach sub-titles in typed text of the desired language are added to the pictures, and the viewers are expected to hear the text in a foreign language and simultaneously to read its translation on the picture itself. Such reading distracts the viewers from the pictures and from the movie in general. Another approach is dubbing, where the original sound-track with the original text is being replaced by another sound-track with the desired language. In this case there is a disturbing mis-match between the sound-track and the movements of the mouth.

There have been some earlier attempts to overcome these disadvantages, none of which have been commercialized because of inherent principal difficulties which made the practical execution unrealistic. Thus, in U.S. Pat. No. 4,600,281 a method is described which performs the measurements of the shape of the mouth manually by a ruler or with a cursor, and corrects the mouth shape by moving pixels within each frame. As will be seen in the description of the invention, the method according to the present invention is inherently different and much superior in the following points: In the present invention the tracking of the shape of the mouth is done automatically and not manually. In the present invention changing the shape of the mouth is done by using a three-dimensional head model, for example like those described by P. Ekman and W. V. Friesen, (Manual for the Facial Action Unit system, consulting Psychologist Press, Palo Alto 1977). In the present invention the mouth area of the actor is replaced using the mouth area of a reference similarity frame. In the present invention mouth status parameters of the dubber are substituted for mouth status parameters of the actor.

The U.S. Pat. No. 4,260,229 relates to a method of graphically creating lip images. This U.S. patent is totally different from the present invention: In the U.S. patent, speech sounds are analyzed and digitally encoded. In the present invention no sound analysis is done; nor is any required at all.

To make for better viewing of the audio visually dubbed movie, the present invention provides a computerized method wherein, in addition to replacing the sound track to the target text, the mouth movements of the actor are being automatically changed to match the target text. The new mouth movements are linguistly accurate and visually natural looking according to all of the observable parameters of the actor's face.

SUMMARY OF THE INVENTION

The present invention provides a method for automated computerized audio visual dubbing of movies, comprising of the following steps (see FIG. 1):

(a) selecting from the movie a frame having a picture, preferably frontal, of the actor's head and, if available, a frame with its side profile;

(b) marking on the face several significant feature points and measuring their locations in the frame;

(c) fitting a generic three-dimensional head model to the actor's two-dimensional head picture by adapting the data of the significant feature points, as measured in stage (b), to their location in the model;

(d) tracking of the said fitted three-dimensional head model parameters throughout the movie, from one frame to its successor, iteratively in an automated computerized way and creating a library of reference similarity frames.

(e) taking a movie of a dubber wherein the dubber speaks the target text;

(f) repeating stages (a), (b), (c), and (d) with the dubber;

(g) normalizing the dubber's minimum and maximum values of each parameter to the actor's minimum and maximum values of the same parameters;

(h) mapping, on a frame to frame basis, the two-dimensional actors face onto its three-dimensional head model by using a texture mapping technique, making use of reference similarity frames;

(i) changing the texture mapped three-dimensional model obtained in stage (h) by replacing, on a frame to frame basis, the original mouth parameters with the mouth parameters as computed in stage (d) for the dubber and obtaining the parametric description for the new picture, with identical values to the original, except that the actor's mouth status resembles the mouth status of the dubber;

(j) texture mapping the lips area of the same actor from a frame in the movie, with identical or very similar mouth status to the desired new mouth status, onto the lips area of the actor's head model for the current frame and then projecting the lips area from the actor's head model onto the current new frame. (This stage is optional, depending on the application.)

By using the three dimensional head model one can control the audio visual dubbing process even if the actor is moving his head. In most applications about 15 significant feature points on the face are used in the tracking stage, such as eye corners, mouth corners, and the nostrills. Only those feature points which are visible to the viewer (using the information available to the model) are tracked.

In the present invention, audio visual dubbing is normally used in conjunction with the use of audio dubbing; but one may also use it in conjunction with an audio track where no equivalent track exists in the original movie.

The method according to the present invention is useful for the audio visual dubbing of motion pictures such as cinematic feature films, advertisements, video, and animated cartoon. Also the audio visual dubbing of still photographs, wherein all of the frames of the movie are the same, is made possible by the present invention. For instance, still photographs are used for this type of movie in T.V. news programs where the reporter's voice is heard while a still photograph of him/her is shown.

Thus, according to the present invention even speachless actors, infants, animals, and inanimate objects can be audio visually dubbed to speak in any language.

According to our invention, the animation process saves much of the labor associated with the animation of the mouth area.

The present invention further provides a computer program (see Appendix 1) for operating the computerized audio visual dubbing.

The present invention further relates to the library of reference similarity frames as created in Step d (above).

BRIEF DESCRIPTION OF THE DRAWINGS

The present invention will be further described by FIGS. 1–4. These figures are solely intended to illustrate the preferred embodiment of the invention and are not intended to limit the scope of the invention in any manner. Likewise, the appended computer program represents an example of the implementation of the method disclosed in the present patent and is not intended to limit the scope of the method in any way.

DETAILED DESCRIPTION OF THE INVENTION

Figure 1:
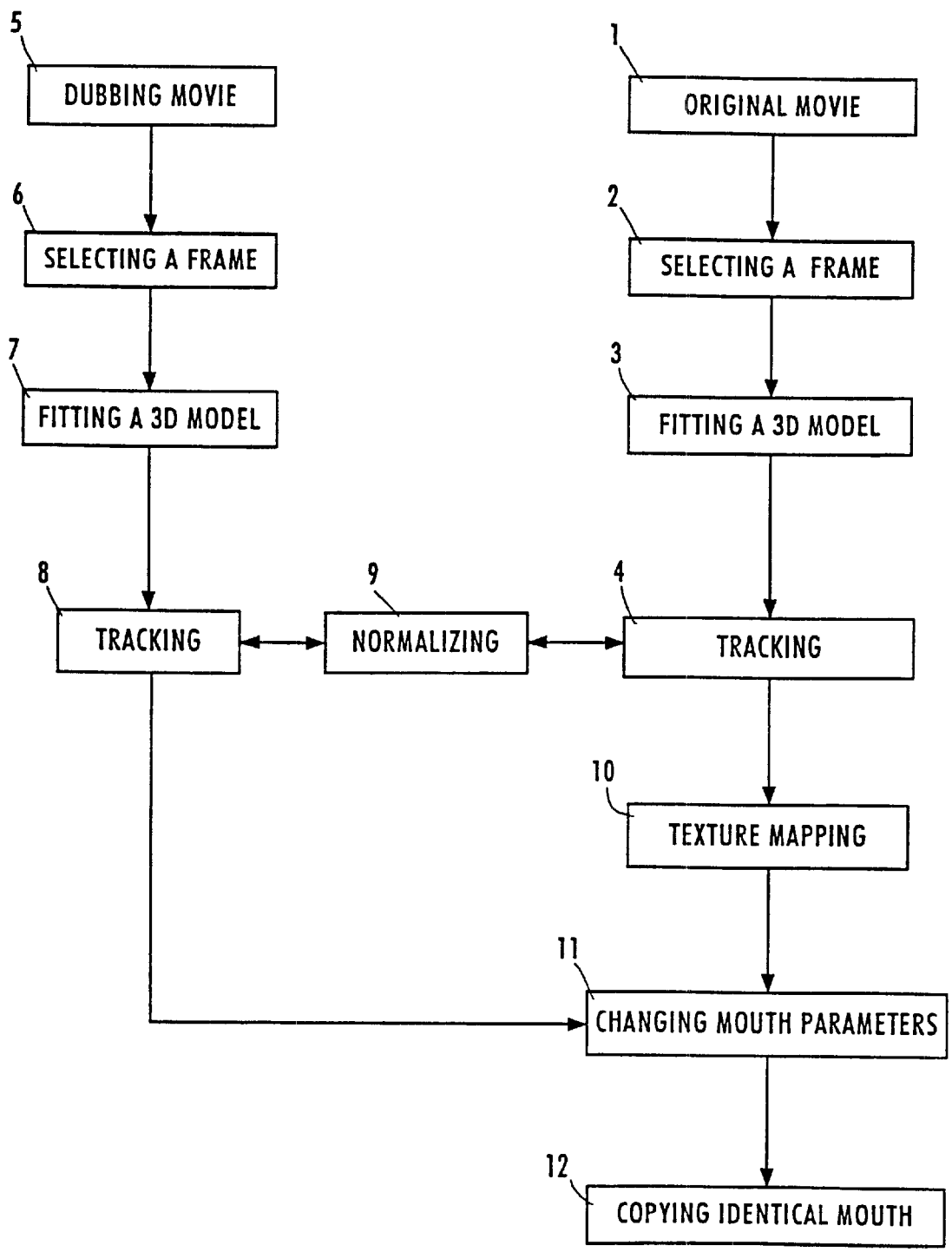
FIG. 1 illustrates a block diagram showing the method stages.

Given an original movie where an actor speaks the original text, a movie of a dubber is made where the dubber speaks the target text in either another language or the same language. The movie of the dubber is taken while the dubber performs a routine dubbing adaptation of the original into the target text.

This invention provides a method for the changing of the actor's facial motions in the original movie to create a new movie having the sound-track in the target text from the movie of the dubber, while the pictures are of the original movie, whereas the motion of the mouth of the actor is modified to correspond to the new sound-track.

For brevity considerations, the description of this invention uses pictures in electronic digital form (composed of an array of pixels), but movies in any other form are treatable as well. In these cases, the movie is translated to a digital form by existing techniques, manipulated in the digital form, and returned back to any desired form by known techniques.

A facial expression can be described by an "action unit", for example the Facial Action Coding System (FACS) by Ekman and Friesen (Ekman et. al.). Action units (AU) stands for a small change in the facial expression which depends on a conscious activation of muscles (H. Li, P. Roivainen, R. Forchheimer, 3-D Motion in Model-Based Facial Image Coding, IEEE Transactions in PAMI, 15 (2), 545–555 (1993)). The AU information is expressed in parameter form. Using the AU parameters, many facial expressions can be controlled. Parameters like face location and size, aspect-ratios of face regions, location of specific face features and many more.

As explained above, one of the stages of this invention is a three-dimensional parameterisation of the face. An example for one such model is the model of Parke (Fredric I. Parke, Parameterized Models for Fatial Animation, IEEE computer Graphics and Applications, 12 (11), 61–68, (1982)) which consists of about 25 parameters. Face parameters can be roughly divided into three main classes: structure parameters, location parameters, and expression parameters.

Structure parameters are fixed for every head and include distance ratios between the mouth and the eyes, the mouth and the chin, width of the model, jaw width, etc. The location parameters are, for example: three parameters for three-dimensional rotation in space and three parameters for three-dimensional translation (position in the real world). The expression parameters are, for instance: mouth width, smile (as an example, the parameter values here may be 0.0 for a very sad mouth and 1.0 for a very happy mouth), jaw opening, upper lip lifting, lower lip lowering, lip thickness, and so on.

Using a face model, the present invention is centered on a computer program (see Appendix 1), which automatically re-shapes the lip movements of the actor according to the lip movements of the dubber by searching for the nearest reference similarity frames. This computer program (software), or similar, is an integral and an important part of the present invention. The process, according to the present invention, is divided generally into the TRACKING phase and the NEW-MOVIE generation phase, as follows:

I. TRACKING phase

Step 1: The first step is personalizing the generic three-dimensional face model for both the actor and the dubber. In order to modify the generic face model to fit a specific face, some additional information is needed. The generic model has to be translated, scaled and stretched to fit the given actor's face, from its initial position and setting. This is done by manually pointing using a pointing device such as a mouth, a touch screen, etc., several facial feature points on the actor's face, e.g. eye corners, mouth corners, top and bottom of face. Typically a total of approximately 15 feature points are used, but this number may vary according to specifications. These feature points are marked on one (any) of the frames in the movie, in which the actor, preferably, faces the camera. The computer program then calculates automatically the exact model parameter's modifications needed for its two-dimensional projection to fit the actor face on the movie frame. In addition to using the facial feature points and in order to increase accuracy, the model is also adjusted to match the head edges, which are computed using an edge detector. If a side view of the actor is available it can be used to set several depth parameters, such as face depth and nose length. Otherwise, the face depth is scaled by some predetermined scale which is set experimentally.

Step 2: After the generic face model has been personalized to the desired actor, face features in several key frames in the movie are marked. The number of such frames can vary from a single first frame to about 5% of all frames, depending on the difficulty of the segment fitting the model to the actor using the marked facial features in those key frames achieves a stabilization of the automatic tracking (described later), and these key frames assures stable and continuous tracking. Next, the program calibrates according to several examples of mouth shapes, later to be used for mouth tracking. Finally, the range of the mouth parameters (mimimum and maximum values) for the specific actor are estimated using all the values of the model parameters fitted to all key frames.

Step 3: The next stage is the automatic tracking of the actor's face throughout the entire movie: This is performed from one frame to its successive frame, using the face model, in two steps: first, the two-dimensional face of the actor is mapped onto the three-dimensional face model using a texture-mapping technique. The model can now be altered by changing its parameters only, creating new, synthetic images, which are otherwise very similar to the original movie frames: everything remains unchanged except for different face location, its orientation, and its expressions. By using a minimization algorithm, either analytic or numerical (such as steepest descent algorithm), the program now computes those parameters which maximize the correlation function between the face area of the actor in the next frame and the synthesized projection of the texture-mapped face model. The steepest descent algorithm increases or decreases parameters in the direction that increases the correlation function. It can either work for each parameter separately (until it maximizes the correlation), or it can modify all the parameters at once.

Step 4: After the model is locked on the head of the actor in the next frame, the mouth has to be tracked. This is done by first, checking the parameters of all of the mouths in the key frames and in several previous frames already tracked. Then, the frame that gives the higher correlation is choosen as a first guess for the tracking. Next, the same minimization algorithm used to track the global head motion is used, until the correlation function has maximized. The parameters describing the face model in the tracked frame are written into a file for later use.

Step 5: Steps 3 and 4 are repeated until the entire movie is processed. For best results, instead of executing this process serially from the first frame to the last, the key frames can be used as initial points of tracking. Every two consecutive key frames are used to track from each of them to the frames between them. That way, stabilasation of the tracking is preserved.

Step 6: The tracking described above is applied to the dubber movie as well.

II. NEW MOVIE generation phase

This phase combines the tracking results of both the original and the dubber's movies, in order to synthesize the new audio visually dubbed movie. This audio visually dubbed movie, as explained above, is mostly formed out of the original movie, except for the face of the actor in this audio visually dubbed movie. This face is a texture-mapped face on the three-dimensional face model, synthesized, as described above, to fit the lip, mouth, and cheek shapes of the dubber at that particular time. Thus, the parameters of the face model computed as described in phase I, is used to produce the new audio visually dubbed movie, in which for every frame in the original movie, the mouth parameters are modified to those of the dubber. The exact process is as follows:

Step 7: For every frame in the original movie, the face of the actor is texture-mapped on the appropriate face model using the parameters that were calculated in step 3 for the original movie. The mouth parameters of the dubber as calculated in step 3 are used as follows for the new audio visually dubbed movie.

Step 8: Once the desired mouth-shape of the actor is known, the original movie is being searched in the neighborhood of the current frame (approximately 0.1–10 seconds forwards and backwards in time) for a mouth that is most similar in shape or parameters to the new desired mouth. This search for the reference similarity frame takes into account the mouth-shape already chosen for the previous frame in order to make the mouth motion smooth and continuous. From the several (5–10) best fit mouths, the mouth which is picked is from the frame that is closest in time to the previous picked mouth.

Step 9: The mouth chosen in step 8 is texture-mapped into the mouth model using its pre-computed parameters. The face model parameters are then changed to the desired mouth shape, producing a very realistic new frame, which replaces the old frame in the original movie. The user of the program can choose the desired mouth area to be texture-mapped in place—it can be either the inside of the mouth, the whole mouth including the lips or even a bigger area. This procedure creates a synthesized image, in which the face around the mouth, and in particular the lips, are re-shaped according to the sound track, while retaining the familiar face of the original actor. Step 8 can also be skipped, so that the inside of the mouth will be empty. This is useful for making a talking movie from still picture, where the inside information of the mouth is missing; because in the reference frame similarity dictionary of the actor there does not exist any near fit of lip shapes for the target. This black interior can also be filled with visual color/texture.

Step 10: Finally, the sound track from the dubbed movie (target text) replaces the original text and sound.

It is to be noted that an animator using the invented software tool, is free to modify, set, or fix any of the head or mouth parameters, in both the original or audio visually dubbed movie, and even pick a specific mouth to be textured-mapped in place, as described in step NM8, all of these at any of the above stages. The tracking program is highly interactive and user-friendly.

The involved software (see Appendix 1) of this invention is very versatile, and can be used in a very wide array of sound/text replacement applications many of which have been mentioned above. The following are examples of some applications of the present invention:

Advertising: For products sold world-wide, an original advertising commercial can be manipulated to produce the same commercial in any desired language. This saves the need to produce a new video for every country or language that the product is aimed for.

Another possibility is to edit a movie, by altering existing scenes without having to re-shoot them again. If, for example, after the movie production was over, the director/editor wishes to alter a specific scene, or change one sentence of a specific actor.

The present invention refers not only to narrated text but also to songs, operas, and music, opening the possibility to change the language of musical video clips.

The production of an animated cartoon is assisted by drawing a line segment for the actor's mouth, drawing a small actor's picture dictionary containing representive reference similarity frames with completely drawn mouths, and then allowing these lip-line segments to be replaced with the corresponding lip shapes of the dubber as are to be found in the actor's picture dictionary.

In general, applications of a method for automatic audio visual dubbing of movie include: cinematic movies, cartoons, documentaries, advertizing, news, educational programs, court documentations, speaches, lectures, historical documentation, hearing committees, home videos, sports events, entertainment events, operas, musicals, musical video-clips, simultaneous translation, and adding speach to sequences of either original or added still frames of the aforesaid.

Furthermore, using the library of the previously described reference similarity frames, the present invention allows one to create new movies altogether, and also to convert background narrative to audio visual speach, and to audio-visualize any written text.

The present invention will be further described by FIGS. 1–4.

FIG. 1 illustrates a block diagram showing the method stages, and its contents is detailed below.

Figure 2A:
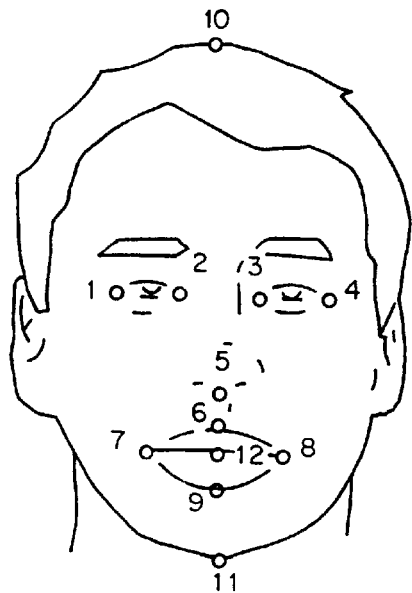
FIGS. 2a and 2b illustrate an example of significant points on a generic frontal picture of a head (FIG. 2a) and a generic side profile picture of a head (FIG. 2b).
Figure 2B:
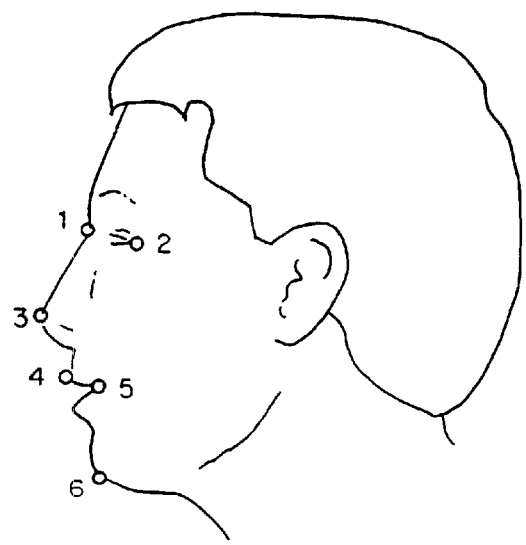

FIGS. 2a and 2b illustrate an example of significant points on a generic frontal picture of a head (FIG. 2a) and a generic side profile picture of a head (FIG. 2b).

Figure 3:
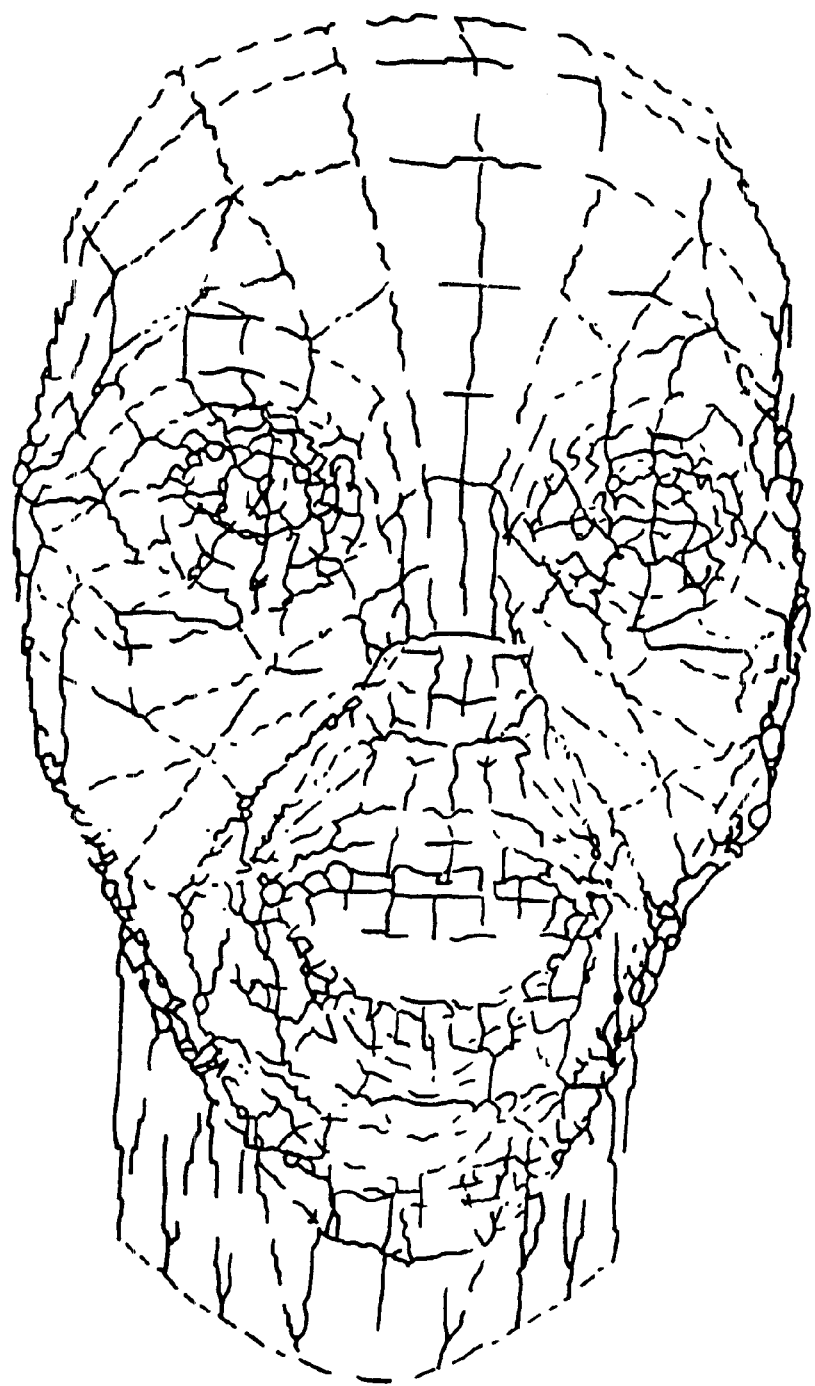
FIG. 3 shows an example of a generic wire frame face model.

FIG. 3 shows an example of a generic wire frame face model.

For illustrative purposes one can take the significant points shown in FIG. 2, measure them on pictures of a real actor, and apply them to a generic wire frame face model (FIG. 3). Fitting a three-dimensional head model to the actor's two-dimensional head picture by adapting the data of the significant points, as measured, results in an integration, as can be seen in FIGS. 4a and 4b.

Figure 4A:
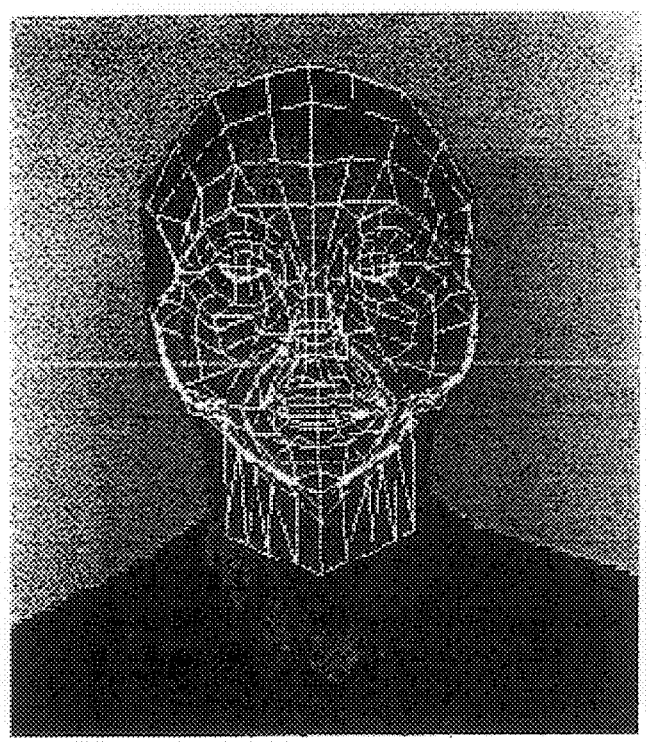
FIG. 4a is an example showing how a customer fitted wire frame model fits onto a frontal view of an actor's face.

FIG. 4a is an example showing how a custom fitted wire frame model fits onto a frontal view of an actor's face.

Figure 4B:
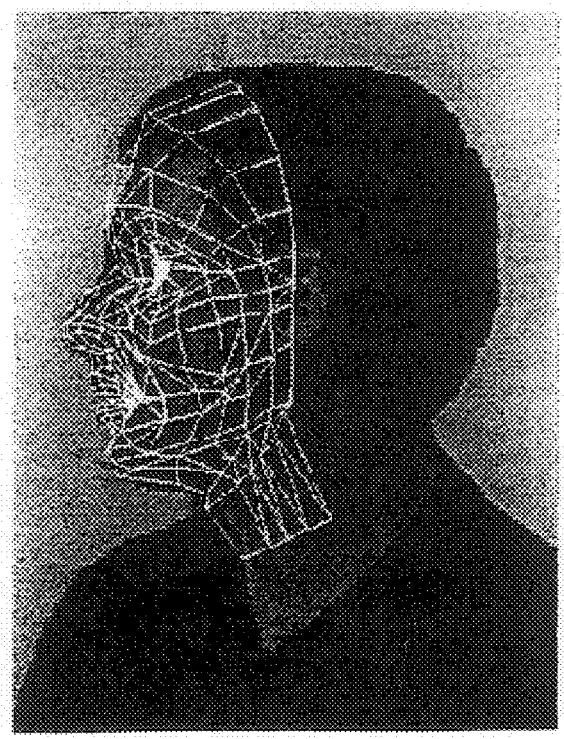
FIG. 4b is an example showing how a custom fitted wire frame model fits onto a profile view of an actor's face.

FIG. 4b is an example showing how a custom fitted wire frame model fits onto a profile view of an actor's face.

FIG. 1 illustrates a block diagram showing the method stages:

In the original movie (1) a frame is selected (2) having a nearly frontal picture of the original actor's head and, if available, a frame is also selected having a picture with his side profile.

A three-dimensional head model is fitted to the actor's two dimensional head picture(s). This model can be controlled by several parameters such as for the position of the head and the status of the mouth. This fitting stage (3) is done by adapting the data of the significant points, as measured in the selected frame, to the model.

The next step (4) is the automated computerized tracking of the fitted three-dimensional head model parameters throughout the movie, from one frame to the next. One partial or complete three-dimensional head model for each frame where the actor appears, is used. Any of the resulting frames can serve as a reference similarity frame for the lips replacement.

A movie of the dubber is taken (5). In this movie the dubber faces the camera in most of the frames. The dubber speaks the target text in this movie.

The same process as applied to the original actor's movie is applied to the dubber's movie: A frame form the dubber's movie is selected (6) having a frontal picture of the dubber's head, and if available, a frame with a picture of his side profile. A three dimensional head model is fitted to the dubber's two dimensional head picture (7) by adapting the data of the significant points, as measured in the selected frame, to the dubber's model. An automated computerized tracking (8) of the said dubber's fitted three dimensional head model parameters is taken throughout the movie, from one frame to the next.

The next stage in this method is to normalize (9) the dubber's minimum and maximum parameters to the actor's minimum and maximum parameters.

In a frame to frame fashion, the original actor's two dimensional face is mapped (10) onto his three dimensional head model. This mapping stage is done by using a texture mapping technique with the reference similarity frames. The result of this stage is one mapped three dimensional partial head model of the original actor for each frame of the original actor in the original movie; wherein the model, corresponding to a given frame may be complete in the case when the original frame contains a frontal view of the actor's face.

In the next stage the textured three dimensional model frames obtained for the original actor are changed (11) by replacing, on a frame to frame basis, the original mouth parameters with mouth parameters as computed for the dubber in the corresponding frames; correspondence being determined by the desired sound track substitution (i.e. the dubbing). Thus is obtained the parametric description for a new picture identical to the original, except that the actor's mouth status resembles the mouth status of the dubber; wherein the new picture corresponds to a frame in the new audio visually dubbed movie.

In order to overcome difficulties like for example those that arise when the dubber in (8) opens a closed mouth in (4), a frame or frames in the original movie are sought whose mouth status is similar to the desired new mouth status. These frames, termed reference similarity frames, are usually but not necessarily in a temporal proximity to the processed frame, and the lips from that frame are copied using texture mapping (12) into the lips area in the new frame. The search for a reference similarity frame is an essential component of the present invention. We therefore repeat its definition: a reference similarity frame is a picture (being a frame in the original movie, a frame in any other movie, or a still photograph) in which the original actor has the desired features of the mouth-shape and head posture suitable for the audio visually dubbed movie.

Alternatively, the reference similarity frame may be taken from a compiled picture library of the original actor or of other actors.

The process (12) is repeated all over again for each frame, until the entire movie is converted.

What is claimed is:

1. A method for automated computerized audio visual dubbing of a movie, comprising the steps of:
    (a) selecting from the movie a frame having a picture of the head of an actor;
    (b) marking on the actors' head a number of significant feature points and measuring their locations in the selected frame;
    (c) fitting a generic three-dimensional head model to the actor's two-dimensional head picture by adapting the data of the significant feature points, as measured in step (b), to their corresponding locations in the model;
    (d) (d1) tracking parameters of the actor fitted three dimensional head model throughout a substantial part of the movie frame-by-frame, iteratively in an automated computerized manner, and
    (d2) creating a library of reference similarity frames;
    (e) taking a dubber's movie of a dubber wherein the dubber speaks a target text;
    (f) repeating steps (a), (b), (c), and (d1) with the dubber's movie, whereby a dubber fitted three dimensional head model is obtained and the parameters of the dubber fitted three dimensional head model are tracked throughout a substantial part of the dubber's movie;
    (g) for each of the parameters, normalizing minimum and maximum values of the dubber fitted three dimensional head model to minimum and maximum values of the actor fitted three dimensional head model, respectively;
    (h) for each frame in the movie where the actor needs to be dubbed, texture mapping a two-dimensional picture of the actor's face appearing in said frame onto the actor fitted three-dimensional head model, making use of the reference similarity frames; and
    (i) changing the actor fitted and texture mapped three dimensional model obtained in step (h) by replacing mouth parameters of the two-dimensional picture of the actor's face with mouth parameters among the parameters tracked in step (d1) for the dubber's movie, thereby obtaining the parametric description for a dubbed picture, with identical values to the two-dimensional picture of the actor's face, except that a mouth status of the actor resembles a mouth status of the dubber.

2. A method according to claim 1 wherein the parameters for controlling the three-dimensional head model are the position, orientation, and expression of the head model mouth.

3. A method according to claim 1 wherein the significant feature points on the face marked on stage b are the eye corners, the mouth corners, and the top and bottom of the face.

4. A method according to claim 1 wherein about 15 significant feature points on the face are used in the tracking stage.

5. A method according to claim 1 wherein the movie to be audio visually dubbed is a sequence of one or more still photographs which are identically duplicated, frame after frame, to create a portion of a movie.

6. A method according to claim 5 for audio visual dubbing of still photographs in TV programs such as news from field correspondents.

7. A method according to claim 5 wherein the actor does not speak such as a baby or a mute person.

8. A method according to claim 1 wherein the original movie is an animated cartoon.

9. A method according to claim 8 wherein the actor is an animal or any other non-human or non-living object.

10. A method according to claim 1 wherein the movies are advertisement movies.

11. A method according to claim 1 wherein the pictures of the movie and of the still photos are in electronic digital form.

12. A method according to claim 1 wherein the pictures are translated into digital form, manipulated in digital form, and returned back to any desired form.

13. A method according to claims 8 wherein the production of an animated cartoon is assisted by drawing a straight line segment for the actor's mouth, drawing a small actor's picture dictionary containing representative reference similarity frames with completely drawn mouths, and then allowing these lip-line segments to be replaced with the corresponding lip shapes of the dubber as are to be found in the actor's picture dictionary.

14. A method according to claim 1 wherein the "movie" is a painting, a drawing, or a picture.

15. A method according to claim 1 for creating new movies or new portions of movies from a library of reference frames.

16. A method according to claim 1 for the conversion of background narrative, or any spoken text, to an audio visual form.

17. A method according to claim 1 wherein the dubber speaks the target text in either another language or the same language and the movie of the dubber is taken while the dubber performs a routine dubbing adaptation of the original into target text.

18. A method for creation of a library of reference similarity frames in the method as defined in claim 1.

19. A method according to claim 1 wherein the automated computerised audio visual dubbing of movies is done by the software, as shown in Appendix 1, or by similar software.

20. A software for use in the method as defined in claim 1.

21. A movie prepared by the automated audio visual dubbing method as defined in claim 1.

22. A movie according to claim 1 wherein the movie is a video movie.

23. The method of claim 1, wherein the picture of the actor's head selected in step (a) is a frontal picture of the actor's head.

24. The method of claim 1, wherein step (a) further comprises selecting another frame having another picture showing a side profile of the actors' head.

25. The method of claim 1, further comprising texture mapping a lip area of the actor from a frame in the movie, with an identical or very similar mouth status to a desired new mouth status, onto a lip area of the actor fitted and texture mapped three dimensional head model; and projecting the lip area from the actor fitted and texture mapped three dimensional head model onto the current frame.

\* \* \* \* \*